(12) United States Patent
Farré Guiu et al.

(10) Patent No.: US 11,645,579 B2
(45) Date of Patent: May 9, 2023

(54) AUTOMATED MACHINE LEARNING TAGGING AND OPTIMIZATION OF REVIEW PROCEDURES

(71) Applicant: Disney Enterprises, Inc., Burbank, CA (US)

(72) Inventors: Miquel Angel Farré Guiu, Bern (CH); Monica Alfaro Vendrell, Barcelona (ES); Marc Junyent Martin, Barcelona (ES); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 584 days.

(21) Appl. No.: 16/723,623

(22) Filed: Dec. 20, 2019

(65) Prior Publication Data
US 2021/0192385 A1    Jun. 24, 2021

(51) Int. Cl.
*G06N 20/00*    (2019.01)
*G06V 20/40*    (2022.01)
*G06F 18/21*    (2023.01)
*G06V 10/778*   (2022.01)

(52) U.S. Cl.
CPC ......... *G06N 20/00* (2019.01); *G06F 18/2185* (2023.01); *G06V 10/7784* (2022.01); *G06V 20/41* (2022.01); *G06V 20/46* (2022.01)

(58) Field of Classification Search
CPC ....... G06N 20/00; G06V 20/41; G06K 9/6264
See application file for complete search history.

(56) References Cited

U.S. PATENT DOCUMENTS

| | | |
|---|---|---|
| 7,375,731 B2 | 5/2008 | Divakaran et al. |
| 7,606,425 B2 | 10/2009 | Bazakos et al. |
| 7,849,048 B2 | 12/2010 | Langseth et al. |
| 8,208,694 B2 | 6/2012 | Jelonek et al. |
| 8,626,682 B2 | 1/2014 | Malik et al. |
| 8,737,817 B1 | 5/2014 | Izo et al. |
| 8,769,556 B2 | 7/2014 | Guo et al. |
| 8,990,128 B2 | 3/2015 | He et al. |
| 8,996,452 B2 | 3/2015 | Danciu et al. |

(Continued)

OTHER PUBLICATIONS

Justin Talbot et al. "EnsembleMatrix: Interactive Visualization to Support Machine Learning with multiple classifiers" CHI 2009, Apr. 4-9, 2009, Boston, MA, USA.

(Continued)

*Primary Examiner* — Kyu Chae
(74) *Attorney, Agent, or Firm* — Farjami & Farjami LLP (57) ABSTRACT

Techniques for machine learning optimization are provided. A video comprising a plurality of segments is received, and a first segment of the plurality of segments is processed with a machine learning (ML) model to generate a plurality of tags, where each of the plurality of tags indicates presence of an element in the first segment. A respective accuracy value is determined for each respective tag of the plurality of tags, where the respective accuracy value is based at least in part on a maturity score for the ML model. The first segment is classified as accurate, based on determining that an aggregate accuracy of tags corresponding to the first segment exceeds a predefined threshold. Upon classifying the first segment as accurate, the first segment is bypassed during a review process.

21 Claims, 7 Drawing Sheets

(56) References Cited

U.S. PATENT DOCUMENTS

| | | | |
|---|---|---|---|
| 9,015,730 B1 | 4/2015 | Allen et al. | |
| 9,807,472 B1 | 10/2017 | Cox | |
| 10,057,644 B1 | 8/2018 | Farre Guiu et al. | |
| 10,515,133 B1* | 12/2019 | Sharifi | G06F 16/48 |
| 11,157,777 B2 | 10/2021 | Farre Guiu et al. | |
| 2002/0184098 A1 | 12/2002 | Giraud et al. | |
| 2002/0186867 A1 | 12/2002 | Gutta et al. | |
| 2005/0080671 A1 | 4/2005 | Giraud et al. | |
| 2006/0053342 A1 | 3/2006 | Bazakos et al. | |
| 2007/0285454 A1 | 12/2007 | Shang et al. | |
| 2008/0002892 A1 | 1/2008 | Jelonek et al. | |
| 2008/0312906 A1 | 12/2008 | Balchandran et al. | |
| 2009/0116695 A1 | 5/2009 | Anchyshkin et al. | |
| 2009/0133051 A1 | 5/2009 | Hildreth | |
| 2009/0196464 A1 | 8/2009 | Dimitrova et al. | |
| 2009/0210902 A1 | 8/2009 | Slaney et al. | |
| 2009/0217315 A1 | 8/2009 | Malik et al. | |
| 2010/0007726 A1 | 1/2010 | Barbieri et al. | |
| 2010/0008547 A1 | 1/2010 | Yagnik et al. | |
| 2010/0067745 A1 | 3/2010 | Kovtun et al. | |
| 2010/0141787 A1 | 6/2010 | Bigioi et al. | |
| 2010/0299210 A1 | 11/2010 | Giraud et al. | |
| 2011/0052012 A1 | 3/2011 | Bambha et al. | |
| 2011/0129126 A1 | 6/2011 | Begeja et al. | |
| 2011/0150295 A1 | 6/2011 | Eckhoff et al. | |
| 2011/0150296 A1 | 6/2011 | Eckhoff et al. | |
| 2011/0150297 A1 | 6/2011 | Eckhoff et al. | |
| 2011/0150298 A1 | 6/2011 | Eckhoff et al. | |
| 2011/0150299 A1 | 6/2011 | Eckhoff et al. | |
| 2011/0231787 A1 | 9/2011 | Tseo et al. | |
| 2012/0072936 A1 | 3/2012 | Small et al. | |
| 2012/0215727 A1 | 8/2012 | Malik et al. | |
| 2012/0278275 A1 | 11/2012 | Danciu et al. | |
| 2013/0036011 A1 | 2/2013 | Roberts et al. | |
| 2013/0325756 A1 | 12/2013 | He et al. | |
| 2014/0368688 A1 | 12/2014 | John Archibald et al. | |
| 2015/0193698 A1* | 7/2015 | Nakamura | G06N 20/00 706/12 |
| 2015/0220567 A1* | 8/2015 | Fol | G06F 16/5866 382/203 |
| 2017/0034822 A1 | 2/2017 | Chae et al. | |
| 2017/0300533 A1 | 10/2017 | Zhang et al. | |
| 2017/0323212 A1 | 11/2017 | Volkov et al. | |
| 2018/0020243 A1* | 1/2018 | Ni | H04N 21/2187 |
| 2019/0034822 A1 | 1/2019 | Guiu et al. | |
| 2020/0005401 A1 | 1/2020 | Bull et al. | |
| 2020/0133978 A1* | 4/2020 | Ramamurti | G06F 8/38 |
| 2020/0326837 A1 | 10/2020 | Ni | |
| 2020/0336802 A1* | 10/2020 | Russell | G06V 10/82 |
| 2020/0349605 A1* | 11/2020 | Geyik | G06Q 30/0246 |
| 2020/0401851 A1* | 12/2020 | Mau | G06K 9/6259 |
| 2021/0019576 A1 | 1/2021 | Farre Guiu et al. | |

OTHER PUBLICATIONS

U.S. Appl. No. 16/512,223, "Quality Control Systems and Methods for Annotated Content," filed Jul. 15, 2019.

* cited by examiner

AUTOMATED MACHINE LEARNING TAGGING AND OPTIMIZATION OF REVIEW PROCEDURES

BACKGROUND

The present disclosure relates to machine learning, and more specifically, to using machine learning to optimize a tagging process and reduce manual review.

Machine learning (ML) algorithms can be used to identify different types of elements in media files at high levels of accuracy. However, to provide high levels of accuracy, the algorithms must be trained based on a training dataset. Preparing an accurate and complete training dataset to train the ML algorithms is difficult due to the amount of data needed, as well as the need to keep the dataset updated (e.g., cleaning the dataset, correcting errors in the dataset, adding more data, and the like). Additionally, existing systems cannot provide transparency to ensure accuracy, nor can they facilitate or expedite review.

SUMMARY

According to one embodiment of the present disclosure, a method is provided. The method includes receiving a video comprising a plurality of segments, and processing a first segment of the plurality of segments with a machine learning (ML) model to generate a plurality of tags, wherein each of the plurality of tags indicates presence of an element in the first segment. The method further includes determining, for each respective tag of the plurality of tags, a respective accuracy value, wherein the respective accuracy value is based at least in part on a maturity score for the ML model. Additionally, the method includes classifying the first segment as accurate, based on determining that an aggregate accuracy of tags corresponding to the first segment exceeds a predefined threshold. Upon classifying the first segment as accurate, the method includes bypassing the first segment during a review process.

According to a second embodiment of the present disclosure, a non-transitory computer-readable medium is provided. The computer-readable storage medium contains computer program code that, when executed by operation of one or more computer processors, performs an operation. The operation includes receiving a video comprising a plurality of segments, and processing a first segment of the plurality of segments with a machine learning (ML) model to generate a plurality of tags, wherein each of the plurality of tags indicates presence of an element in the first segment. The operation further includes determining, for each respective tag of the plurality of tags, a respective accuracy value, wherein the respective accuracy value is based at least in part on a maturity score for the ML model. Additionally, the operation includes classifying the first segment as accurate, based on determining that an aggregate accuracy of tags corresponding to the first segment exceeds a predefined threshold. Upon classifying the first segment as accurate, the operation includes bypassing the first segment during a review process.

According to a third embodiment of the present disclosure, a system is provided. The system includes one or more computer processors, and a memory containing a program which, when executed by the one or more computer processors, performs an operation. The operation includes receiving a video comprising a plurality of segments, and processing a first segment of the plurality of segments with a machine learning (ML) model to generate a plurality of tags, wherein each of the plurality of tags indicates presence of an element in the first segment. The operation further includes determining, for each respective tag of the plurality of tags, a respective accuracy value, wherein the respective accuracy value is based at least in part on a maturity score for the ML model. Additionally, the operation includes classifying the first segment as accurate, based on determining that an aggregate accuracy of tags corresponding to the first segment exceeds a predefined threshold. Upon classifying the first segment as accurate, the operation includes bypassing the first segment during a review process.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments of the present disclosure provide techniques to optimize ML tagging and expedite review procedures. In an embodiment, media content is evaluated using one or more ML models to identify elements and generate corresponding tags. The media content can include, without limitations, images, video, audio, as well as a combination of video, audio, and/or images. In embodiments, the elements identified can include objects, actions, events, people or characters, locations, and the like. For example, the system may identify and tag each character in a given scene, each time an action occurs, each time a particular object is in the scene (such as a car), and the like. As a further example, the system may identify the location of a scene (e.g., based on visible landmarks such as the Statue of Liberty, signs visible in the scene, and the like) and generate a tag identifying the location. Each tag can indicate the corresponding element that was identified. If the media includes video content, the tag can be further associated with the sections or portions of the video during which the element is present (e.g., one or more timestamps or frames).

In some embodiments, in addition to generating tags, the system can further determine an accuracy score or metric of each tag, based on the ML model. In one embodiment, the accuracy of a tag is based on the confidence of the associated classification, as well as the maturity of the corresponding model. The confidence can be based on a probability or likelihood that the tag is accurate (e.g., a confidence generated by the ML model, indicating a confidence that the element actually belongs to the assigned classification). Further, in an embodiment, the model maturity is defined on a per-element basis (e.g., each classification can be associated with a corresponding model maturity). In one embodiment, the maturity for a given element is based on the ratio between the number of times the ML model correctly identifies the given element, compared to the number of times the given element is actually present in the media. In at least one embodiment, one or more human users evaluate the accuracy of the generated tags to determine the maturity of the model. Thus, a fully mature model, with respect to any given element, is one that accurately identifies the element every time it appears in the media.

In some embodiments, the maturity of the model is determined not only based on the current model, but also based on historical models (e.g., prior versions of the model). That is, the maturity for the current model can be defined as an aggregation that includes the maturity of each previous version. In some embodiments, the weight of prior models when aggregating is based on the age of the prior model. For example, older versions of the model may be given less weight such that the immediately-prior version is given less weight than the current model, while the version that preceded the immediately-prior version is given even less weight, and so on. In other words, the maturity score is generated by aggregating a plurality of model-specific scores for a plurality of versions of the ML model, wherein a respective weight assigned to each respective version of the plurality of versions is inversely proportional to a respective age of the respective version.

In an embodiment, the accuracy of the tags can be evaluated to expedite review procedures, as discussed in more detail below. For example, suppose the media content includes video. In one embodiment, the review procedure can include outputting the video for display, along with an indication of the generated tags in each section of the video (e.g., each frame, each scene, or any other portion of the video). A user can then approve, reject, and/or modify each tag. In an embodiment, based on the accuracy of each tag (e.g., the model confidence and/or model maturity), the system can dynamically optimize and expedite the process by bypassing tags with sufficient accuracy. Further, in at least one embodiment, the system aggregates accuracy within a given scene, and enables the user to quickly skip entire segments of the content when the tags are accurate. In some embodiments, aggregating the accuracy within the scene can include identifying the minimum accuracy, averaging the accuracy scores, and the like.

Figure 1:
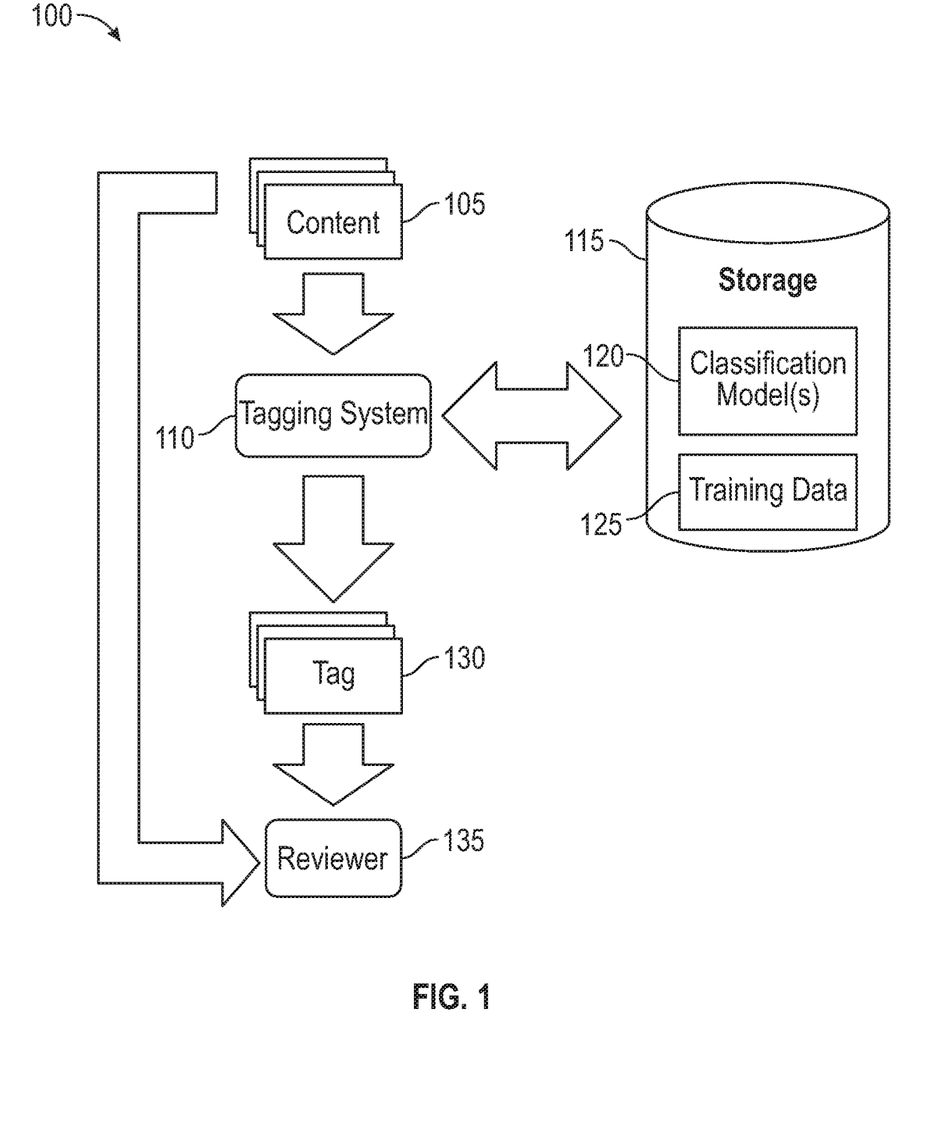
FIG. 1 illustrates a workflow for optimizing a tagging and review process using machine learning, according to one embodiment disclosed herein.

FIG. 1 illustrates a workflow 100 for optimizing a tagging and review process using machine learning, according to one embodiment disclosed herein. In the illustrated embodiment, media Content 105 is provided to a Tagging System 110, which utilizes one or more Classification Model(s) 120 and Training Data 125 to generate one or more Tags 130. In the illustrated embodiment, the Classification Model(s) 120 and Training Data 125 reside in a Storage 115, but may reside in any suitable location in various embodiments. In embodiments, each of the Tags 130 identifies elements that are present in the Content 105, as well as an indication of where and/or when the element is present. For example, for video Content 105, the Tags 130 may indicate a timestamp, frame, and/or screen location during which each character or actor is visible. Similarly, for audio Content 105, the Tags 130 can indicate times when given sound elements (e.g., effects, instruments, voices, and the like) are present. Although video content is used in several examples herein, embodiments of the present disclosure can be readily applied to any other media, including individual images, audio data, and the like.

In the illustrated embodiment, the Classification Models 120 are ML models (e.g., neural networks, deep neural networks, etc.) trained to identify elements in the Content 105, based on Training Data 125. An artificial neural network, also known simply as a neural network, may refer to a type of machine learning framework in which patterns or learned representations of observed data are processed using highly connected computational layers that map the relationship between inputs and outputs. A deep neural network, in the context of deep learning, may refer to a neural network that utilizes multiple hidden layers between input and output layers, which may allow for learning based on features not explicitly defined in raw data. The Training Data 125 includes labeled exemplars (e.g., Content 105 and corresponding Tags 130). For example, the Training Data 125 can include all or part of a video (e.g., an episode of a show) along with corresponding tags indicating which characters are present at given points in the show (e.g., for one or more frames, scenes, sub scenes, or any other subset or segment of the episode). In one embodiment, each Classification Model 120 can be media-dependent or media-independent.

As used herein, a given Classification Model 120 is media-dependent if it is trained/used for a given set of media (e.g., to identify elements that are specified to a given movie or series), while another Classification Model 120 is media-independent if it is applicable across sets of media. For example, a Classification Model 120 trained to identify characters in a series is media-dependent in that it can be used for any episode of the show, but is likely not suitable for other series. Similarly, a model trained to identify objects or actions may be media-independent in that it can likely identify objects/actions in any media content (e.g., show or movie), and is not constrained to a particular set of media (unless some or all of the objects and/or actions are specific to the set of media).

In one embodiment, the Training Data 125 includes tags that were manually created or validated (e.g., by a human reviewer), to ensure the quality of the Classification Models 120. In some embodiments, the Training Data 125 can further include automatically-tagged Content 105 where the Tags 130 are associated with an accuracy score (e.g., a confidence and/or maturity level) that exceeds a predefined threshold, as discussed below in more detail. In some embodiments, the confidence generated by the model may be an unreliable indicator of the accuracy of the classification. For example, a model may have high confidence in a classification based on a relatively small set of instances/exemplars it has, but the maturity of the model may still be low (e.g., if the character appears in a slightly different way in other examples unseen by the model). In some embodiments, the system therefore considers both confidence and model maturity. In at least one embodiment, the Classification Models 120 can be periodically retrained or refined to generate new versions, using new Training Data 125. In this way, the models continue to improve over time.

In the illustrated embodiment, some or all of the Tags 130 are then provided to a Reviewer 135, along with the original Content 105. In an embodiment, the Reviewer 135 reviews the Content 105 and corresponding Tags 130 to validate them (e.g., approve, reject, and/or modify them). For example, in one embodiment, the Content 105 is output for display to a user, and the generated Tags 130 are provided or displayed at the appropriate points in the Content 105. The user can then manually approve, reject, or modify each Tag 130. In some embodiments, the system can dynamically collapse or bypass sections of the content 105 with sufficient accuracy (e.g., sufficient prediction confidence and/or sufficient model maturity), as discussed in more detail below. This yields a more efficient tagging workflow 100.

Figure 2:
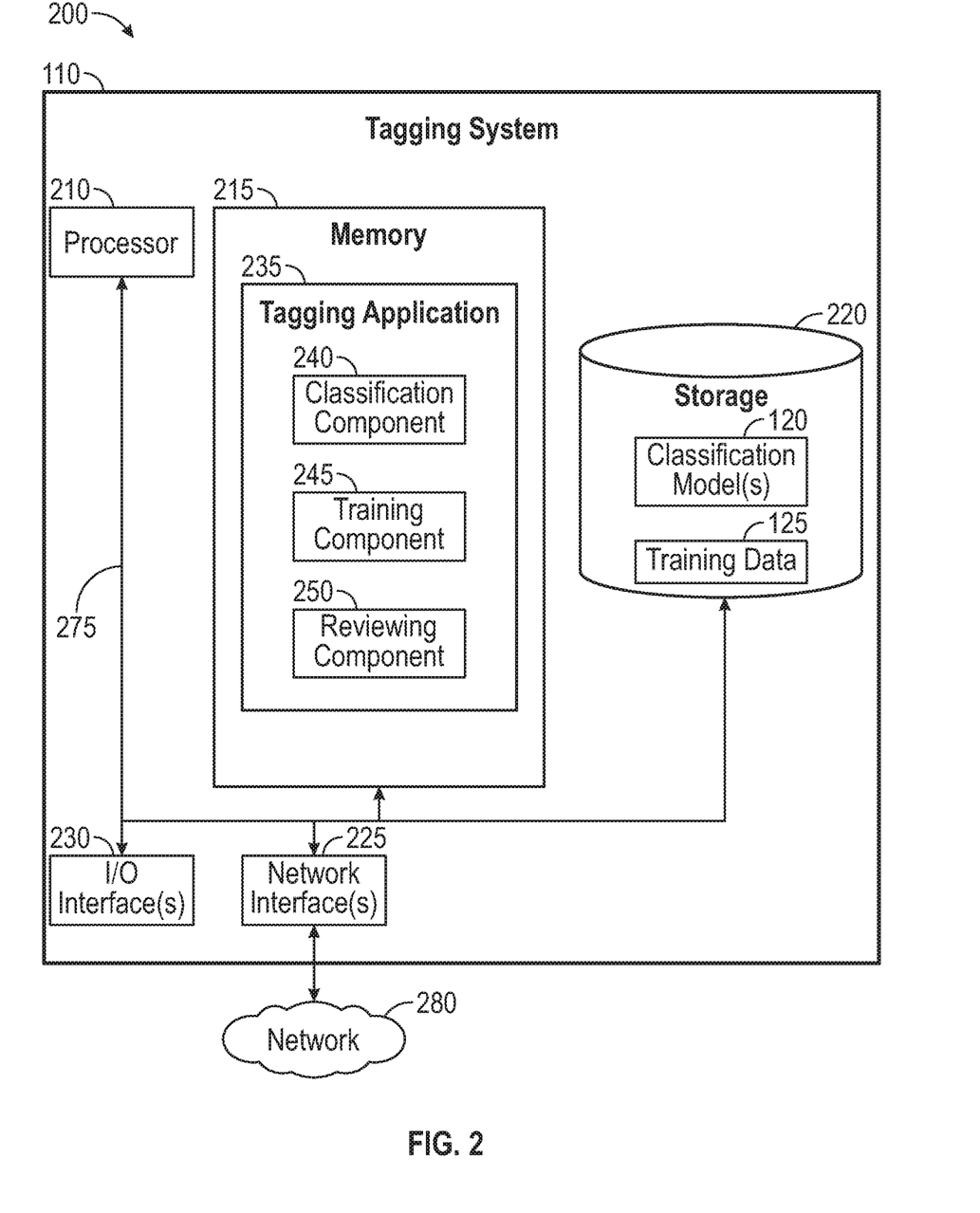
FIG. 2 is a block diagram illustrating a tagging system configured to utilize machine learning to optimize tagging and review, according to one embodiment disclosed herein.

FIG. 2 is a block diagram illustrating a Tagging System 110 configured to utilize machine learning to optimize tagging and review, according to one embodiment disclosed herein. Although depicted as a physical device, in embodiments, the Tagging System 110 may be implemented using virtual device(s), and/or across a number of devices (e.g., in a cloud environment). As illustrated, the Tagging System 110 includes a Processor 210, Memory 215, Storage 220, one or more Network Interfaces 225, and one or more I/O Interfaces 230. In the illustrated embodiment, the Processor 210 retrieves and executes programming instructions stored in Memory 215, as well as stores and retrieves application data residing in Storage 220. The Processor 210 is generally representative of a single CPU and/or GPU, multiple CPUs and/or GPUs, a single CPU and/or GPU having multiple processing cores, and the like. The Memory 215 is generally included to be representative of a random access memory. Storage 220 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as a keyboard, a monitor, a mouse, etc.) are connected via the I/O Interface(s) 230. Further, via the Network Interface(s) 225, the Tagging System 110 can be communicatively coupled with one or more other devices and components (e.g., via the Network 280, which may include the Internet, local network(s), and the like). As illustrated, the Processor 210, Memory 215, Storage 220, Network Interface(s) 225, and I/O Interface(s) 230 are communicatively coupled by one or more Buses 275.

In the illustrated embodiment, the Storage 220 includes a set of Classification Models 120 and the Training Data 125. Although depicted as residing in Storage 220, in some embodiments, the Classification Models 120 and Training Data 125 may reside in any suitable location. In addition, the Classification Models 120 may reside in one or more locations. In at least one embodiment, some of the Classification Models 120 are trained and maintained by the Tagging System 110, while others are maintained by third parties and are accessed using the Network 280 (e.g., via one or more application programming interfaces or APIs). For example, in one such embodiment, the Tagging System 110 can maintain media-dependent Classification Models 120 (e.g., for shows and movies associated with the entity maintaining, controlling, and/or using the Tagging System 110).

Media-independent Classification Models 120, in contrast, may be accessed via the Network 280. For example, independent models (e.g., models trained to identify generic or non-specific elements such as vehicles, signs, actions, objects, and the like) may be generically-applicable, and thus provided by one or more third parties. This can enable the media-independent Classification Models 120 to be trained on wider sets of data, enabling the Tagging System 110 to achieve greater accuracy, as well as offloading computing resource usage to a third party. Thus, in one embodiment, the Tagging System 110 can determine whether to access one or more external Classification Models 120 or to utilize locally-trained Classification Models 120, depending on the desired task.

In the illustrated embodiment, the Memory 215 includes a Tagging Application 235. Although depicted as software residing in Memory 215, the functionality of the Tagging Application 235 can be implemented using hardware, software, or a combination of hardware and software. The Tagging Application 235 includes a Classification Component 240, a Training Component 245, and a Reviewing Component 250. Although depicted as discrete components for conceptual clarity, in embodiments, the operations of the Classification Component 240, Training Component 245, and Reviewing Component 250 can be combined or distributed across any number of components.

The Classification Component 240 generally receives media content and evaluates it using the Classification Models 120 to identify elements present in the media and generate corresponding tags. In one embodiment, for video content, the Classification Component 240 assigns tags on a per-frame basis. That is, the Classification Component 240 can separately evaluate each frame of the input video to identify elements that are visually-present. In another embodiment, the Classification Component 240 evaluates the content on a per-scene basis (or per sub-scene, or any other logical segmentation of the content). In some embodiments, the input content has predefined segment divisions included (e.g., in accompanying metadata). For example, video content for an episode of a show can include indications where commercial breaks are inserted, and/or transitions between scenes or sub-scenes.

In one embodiment, the Classification Component 240 further generates an accuracy score including confidence and/or maturity scores for each generated tag. This can be based, in part, on the confidence score returned by the Classification Model 120. Additionally, in some embodiments, the Classification Component 240 computes a maturity of the Classification Model 120. In at least one embodiment, the maturity is determined on a per-element basis, such that a given model may be highly mature with respect to a first element (e.g., a first character in the show) and immature with respect to another (e.g., a second character in the show different from the first character).

In an embodiment, the maturity of a given Classification Component 240 is defined as the ratio or percentage of times an element is accurately identified, as compared to how often it actually appears in the content. In one embodiment, the maturity of the model for a given element is not computed until a predefined minimum number of data points are available (e.g., one hundred appearances of the element). For example, if a first character appears one hundred times in an episode and the model accurately identifies her seventy-five times (as determined by a human reviewer), the Classification Component 240 can determine that the maturity of the model, with respect to the first character, is 0.75.

Additionally, in at least one embodiment, the Classification Component 240 determines the maturity of a given version of model based, in part, on the maturity of past versions. In one embodiment, the Classification Component 240 aggregates the maturities with an equal weighting. In another embodiment, the Classification Component 240 applies a scaled weighting based on the age of the version.

For example, more recent versions can be weighted relatively higher than older versions, such that the final maturity score more-closely indicates the aggregate quality of the current version (as compared to a flat aggregation). In other words, the maturity score is generated by aggregating a plurality of model-specific scores for a plurality of versions of the ML model, wherein a respective weight assigned to each respective version of the plurality of versions is inversely proportional to a respective age of the respective version.

In one embodiment, more recent versions of the model are assigned relatively higher weights to reflect that the recent versions may have been trained after a human reviewed and corrected one or more tags. Additionally, in some embodiments, more recent models are assigned higher weight to account for potential changes in the character over time. For example, by assigning recent models higher weight, the system enables increased focus on more recent images of the character, which allows the system to account for age and stylistic changes. The model may be highly accurate with respect to older images of the character (e.g., with a first hairstyle), but inaccurate with respect to the character's new style. To account for this, the maturity of the model is skewed towards more recent models, in order to reflect this difficulty in identifying the (new) images of the character.

In one embodiment, the Training Component 245 is used to generate and/or refine the Classification Models 120. In various embodiments, the Training Component 245 can do so periodically (e.g., on predefined intervals), upon determining that sufficient new Training Data 125 is available (e.g., a predefined number of new tags or exemplars that have not been used to train the model), and/or upon manual initiative (e.g., from a user or administrator). For example, as additional Training Data 125 becomes available (e.g., when a new episode is released for a given series), the Training Component 245 can use the newly-generated (and/or manually curated) tags to refine the corresponding Classification Model(s) 120 for the series. This re-training may occur each time new data is available, after a predefined number of examples or episodes have been evaluated, and the like.

In the illustrated embodiment, the Reviewing Component 250 facilitates validation of the generated tags for input content. In at least one embodiment, the Reviewing Component 250 does so based in part on the accuracy (e.g., the maturity and/or confidence) of the included tags. In one embodiment, if the accuracy of a given tag exceeds a predefined threshold, the Reviewing Component 250 can collapse, skip, or otherwise bypass the tag. In some embodiments, the Reviewing Component 250 evaluates each defined subsection of the content (e.g., each scene) to determine, for each subsection, whether the entire subsection should be bypassed.

For example, the Reviewing Component 250 can identify satisfactory scenes by identifying scenes where all of the tags have sufficiently high accuracy (defined as high confidence and high maturity). In an embodiment, sufficient accuracy is defined using one or more predefined thresholds. In at least one embodiment, a different threshold can be applied to each aspect of the accuracy. For example, the Reviewing Component 250 may determine that the scene is sufficiently accurate if the aggregate model maturity exceeds a first threshold (e.g., 0.85) and the aggregate tag confidence exceeds a second threshold (e.g., 0.75).

In an embodiment, the entire scene can then be bypassed. In at least one embodiment, if any tag does not meet the accuracy criteria, the Reviewing Component 250 can present the entire scene for review (e.g., by a human). In some embodiments, if the tag has either low confidence and high maturity, or high confidence and low maturity, the system determines that the tag should be reviewed. Additionally, in some embodiments, the Classification Component 240 can generate "unknown" tags indicating that an element is detected (e.g., a person) but not recognized/identified (e.g., the system cannot tell who the person is). In an embodiment, if a scene includes an "unknown" tag, the Reviewing Component 250 can determine not to skip the scene during review.

The Reviewing Component 250 can then present the identified segments needing validation, along with the corresponding tags, to a user. The user can then approve, reject, and modify the tags. In one embodiment, based on the user feedback, the Reviewing Component 250 can update the Training Data 125 and/or maturity score of the Classification Model 120 that generated the given tag. For example, if the user approves a tag without modification, the Reviewing Component 250 may add the tag and section of content as a new exemplar in the Training Data 125, and/or update the statistics of the Classification Model 120 to indicate the accurate detection. Similarly, if the user rejects or modifies a tag, the Reviewing Component 250 can update the corresponding model statistics (and, in some embodiments, include it as a new training exemplar).

Further, in at least one embodiment, the Classification Component 240 clusters any unknown tags based on similarity, and assigns a cluster identifier to each. That is, if the Classification Component 240 cannot determine an identity of a character, but can tell that two or more tags are tied to the same person, the Classification Component 240 can assign a cluster ID to these tags. If a user subsequently provides a label or identity to the Reviewing Component 250 for one such unknown tag, the Reviewing Component 250 can propagate this label to all other tags associated with the cluster. This reduces the manual curation needed, as the user need only label a single instance of the person, allowing the Reviewing Component 250 to automatically label all other unknown tags in the cluster. In embodiments, this new label can similarly be used to update the Training Data 125 and/or Classification Model 120.

In at least one embodiment, the user may select whether to update the Training Data 125 or not. For example, if the unknown tag (or a corrected tag) corresponds to an extra or other background actor, the user may determine that it would be wasteful and unnecessary to train the Classification Model 120 to identify this person. In one embodiment, the user can therefore instruct the Reviewing Component 250 to refrain from adding the label to the Training Data 125. In another embodiment, the default position is to refrain from doing so, and the user must affirmatively request that the Reviewing Component 250 add the data to the Training Data 125 (e.g., for new characters that are expected to return again in future episodes, or for characters that are present and relevant for multiple sections or scenes in the episode).

Figure 3:
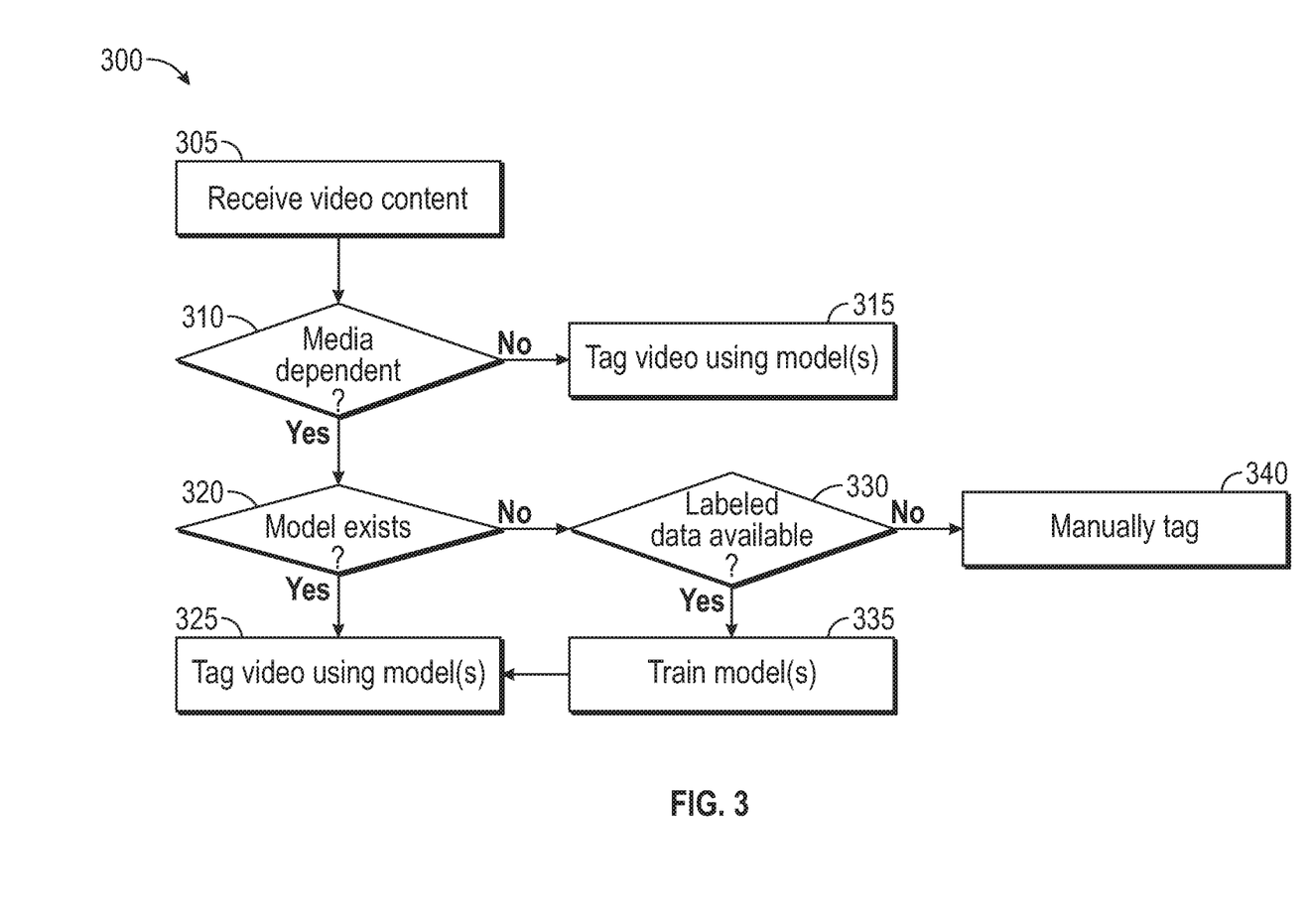
FIG. 3 is a flow diagram illustrating a method for tagging media content, according to one embodiment disclosed herein.

FIG. 3 is a flow diagram illustrating a method 300 for tagging media content, according to one embodiment disclosed herein. The method 300 begins at block 305, where a Tagging System 110 receives video content. As discussed above, although video content is described here for conceptual purposes, the method 300 can similarly be applied to other content, including audio, individual images, and the like. In one embodiment, the Tagging System 110 further receives an indication of the desired task (e.g., the type of elements to identify). For example, the Tagging System 110 can determine whether it should analyze the received content to identify characters, objects, actions, and the like, or a combination thereof.

At block 310, the Tagging System 110 determines whether the task is media-dependent. That is, the Tagging System 110 determines whether the requested task requires use of one or more models trained specifically for the content (e.g., trained for the particular series or movie), or if generic independent models can be used. If the task is media-independent, the method 300 proceeds to block 315, where the Tagging System 110 tags the video using one or more existing ML models. In one embodiment, this includes accessing the models via a third party (e.g., as a service) using one or more APIs. In some embodiments, the Tagging System 110 nevertheless uses internally-maintained models for independent tasks.

Returning to block 310, if the Tagging System 110 determines that the task is media-dependent, the method 300 proceeds to block 320, where the Tagging System 110 determines whether there is an existing model capable of performing the task with sufficient confidence (e.g., using one or more predefined thresholds). If so, the method 300 proceeds to block 325 where the Tagging System 110 tags the video using the identified model(s). If no sufficient model is available, the method 300 proceeds to block 330, where the Tagging System 110 determines whether sufficient labeled training data exists for the task (e.g., prior episodes with manual tags, or a predefined minimum exemplars).

If sufficient training data is available, the method 300 continues to block 335, where the Tagging System 110 uses the training data to train one or more new ML models (or to refine one or more existing ML models). If these newly-trained or newly-refined models have sufficient maturity, the method 300 then proceeds to block 325, where the Tagging System 110 tags the received data using the newly-trained or newly-refined models. In one embodiment, if the models are still insufficient (e.g., with a confidence/quality below a defined threshold), the method 300 proceeds to block 340. Similarly, if, at block 330, the Tagging System 110 determines that no (or insufficient) labeled training data is available, the method 300 continues to block 340. At block 340, the Tagging System 110 provides the received content to one or more users to be manually tagged. These manual tags can, in some embodiments, be used to train or refine ML models. For example, the method 300 may return to block 330 to determine whether there is now sufficient labeled data, and/or to block 335 to train and/or refine the models.

Figure 4:
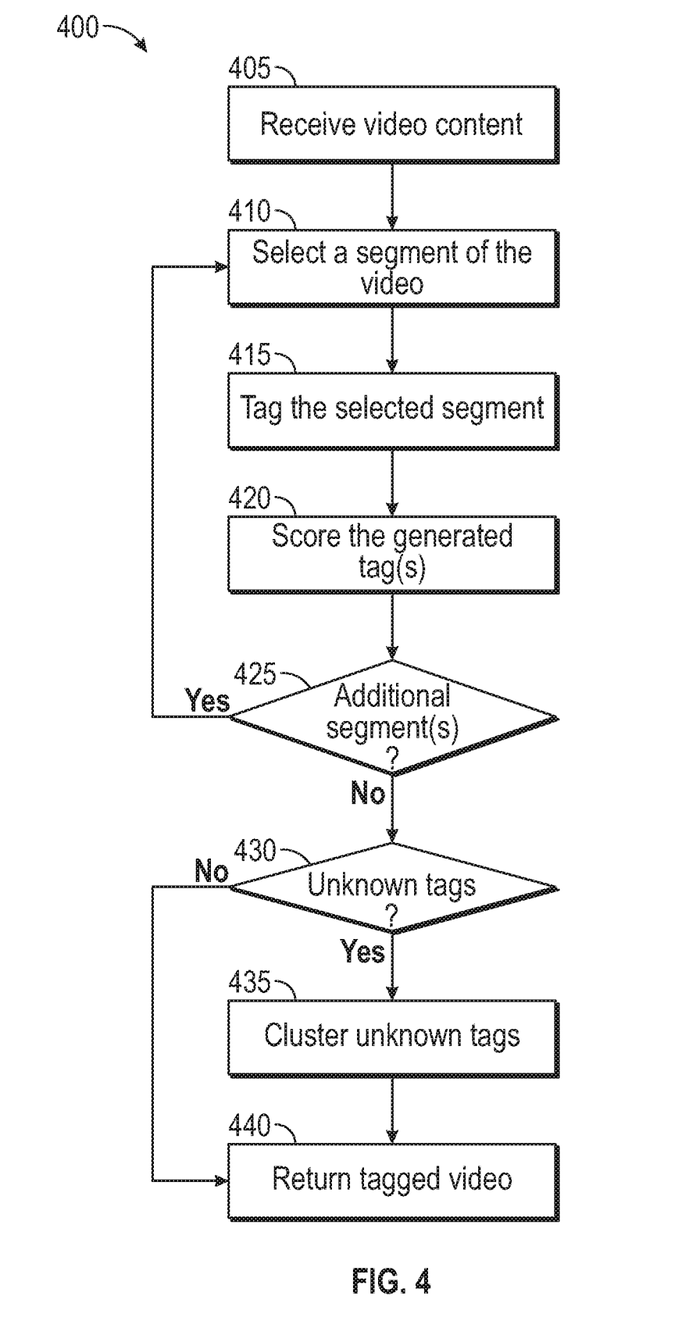
FIG. 4 is a flow diagram illustrating a method for evaluating media content to automatically generate tags using machine learning, according to one embodiment disclosed herein.

FIG. 4 is a flow diagram illustrating a method 400 for evaluating media content to automatically generate tags using machine learning, according to one embodiment disclosed herein. The method 400 begins at block 405, where a Tagging System 110 receives video content to be tagged. In one embodiment, this content is media-dependent content. At block 410, the Tagging System 110 selects a segment of the received content. The delineation between segments may be based on any number of factors, and can include selecting individual frames, selecting scenes or sub-scenes, selecting segments delineated by a user (e.g., the editor or director), and the like. The method 400 then proceeds to block 415.

At block 415, the Tagging System 110 uses one or more ML models to tag the selected segment of the content. In an embodiment, this is accomplished by providing the content section as input to the model, where the model generates accompanying tags based on the element(s) identified in the segment. Further, at block 420, the Tagging System 110 scores the generated tags. In one embodiment, this accuracy score is based in part on the confidence measure generated by the ML model. Additionally, in some embodiments, the score for a given tag is based in part on the element-specific maturity of the underlying ML model. This maturity can include the accuracy of the current model, as well as scaled or weighted accuracy of prior versions of the model.

In one embodiment, as discussed above, the Tagging System 110 can generate "unknown" tags for some elements. An unknown tag generally indicates the presence of an element (e.g., a person) without identifying the individual label (e.g., the identity or name of the person). In some embodiments, the ML model generates unknown tags for identified elements that cannot be confidently classified into any given label or classification.

The method 400 then continues to block 425, where the Tagging System 110 determines whether there is at least one additional segment remaining to be evaluated and tagged. If so, the method 400 returns to block 410. In the illustrated embodiment, blocks 410, 415, and 420 are repeated for each segment of the input. Otherwise, the method 400 proceeds to block 430. At block 430, the Tagging System 110 determines whether any unknown tags were generated. If not, the method 400 proceeds to block 440, where the tagged video is returned (e.g., for validation, and/or for output or storage). If at least two unknown tags were generated, however, the method 400 proceeds to block 435, where the Tagging System 110 clusters the unknown tags.

That is, in an embodiment, the Tagging System 110 determines similarity scores between each unknown tag (e.g., the underlying content the tag is associated with) and groups the tags based on their similarity. This allows the Tagging System 110 to generate more specific and useful unknown tags. Stated differently, rather than relying on a generic "unknown" class that requires individual review, the Tagging System 110 can generate clusters of unknown labels to expedite review. For example, the Tagging System 110 can generate a first cluster for a first unknown character, and a second cluster for a different unknown character. When a user labels any example from the first cluster, the Tagging System 110 can then automatically extend this label to all other tags in the cluster. The method 400 then continues to block 440, where the tagged video is returned (e.g., for validation, and/or for output or storage).

Figure 5:
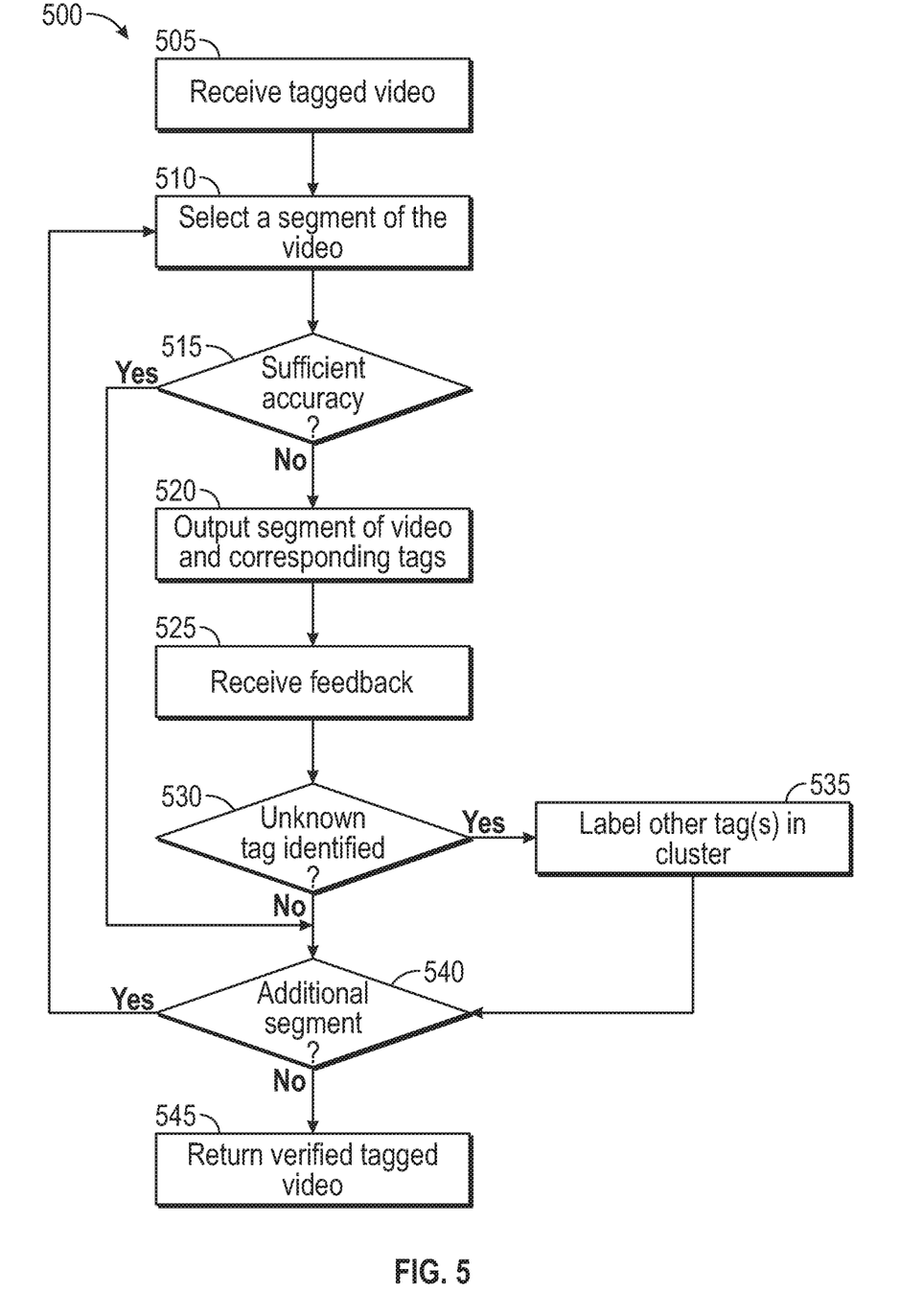
FIG. 5 is a flow diagram illustrating a method for optimized review and verification of media tags, according to one embodiment disclosed herein.

FIG. 5 is a flow diagram illustrating a method 500 for optimized review and verification of media tags, according to one embodiment disclosed herein. The method 500 begins at block 505, where the Tagging System 110 receives tagged video content for review/validation. At block 510, the Tagging System 110 selects a segment of the content (e.g., a scene, sub-scene, and the like). In one embodiment, the Tagging System 110 selects and evaluates the segments sequentially (e.g., based on the order they appear in the original content). The method 500 then proceeds to block 515, where the Tagging System 110 determines whether there is sufficient confidence and/or maturity in the accuracy of the tags in the selected segment. In one embodiment, the Tagging System 110 does so by aggregating the score of each individual tag associated with the selected segment. In another embodiment, the Tagging System 110 determines whether all of the tags exceed a predefined confidence and/or maturity score. Additionally, in one embodiment, the Tagging System 110 confirms whether there are any unknown labels included in the selected segment.

In the illustrated embodiment, if the segment is sufficiently accurate (e.g., no tags fall below a predefined threshold of accuracy and no unknown tags are present), the method 400 bypasses the review procedure and proceeds to block 540. Returning to block 515, if the Tagging System 110 determines that the selected segment requires review, the method 500 continues to block 520.

At block 520, the Tagging System 110 outputs the selected segment, along with the corresponding tags. In one embodiment, this includes displaying the segment on a graphical user interface (GUI), along with an indication of the generated tags (e.g., on a timeline corresponding to the segment, overlaid on the content, or in a separate section of the GUI). At block 525, the Tagging System 110 receives feedback regarding the tags. In an embodiment, this feedback can include, for each tag, approval of the tag, rejection of the tag, and/or modification of the tag (e.g., changing the label, timestamp, and/or coordinate of the tag on the screen).

The method 500 then continues to block 530, where the Tagging System 110 determines whether the feedback includes a new label for a previously-unknown tag. If not, the method 500 continues to block 540. If the feedback includes a new label for a previously-unknown tag, the method 500 proceeds to block 535, where the Tagging System 110 identifies all other tags that correspond to the cluster to which the previously-unknown tag belongs. The Tagging System 110 then labels these identified tags using the newly-received identifier/label. In this way, the Tagging System 110 can bypass these newly-labeled unknown tags for future subsets of the video (e.g., in future scenes). The method 500 then continues to block 540.

At block 540, the Tagging System 110 determines whether there is at least one additional segment of the content yet to be evaluated. If so, the method 500 returns to block 510 to repeat blocks 510, 515, 520, 525, 530, and/or 535 for each segment. Otherwise, the method 500 proceeds to block 545. At block 545, the Tagging System 110 returns the verified/validated video, along with the generated and/or reviewed tags. In this way, the Tagging System 110 optimizes the review process by bypassing scenes or segments with accurate tags, and collapsing unknown tags into groups or clusters.

Figure 6:
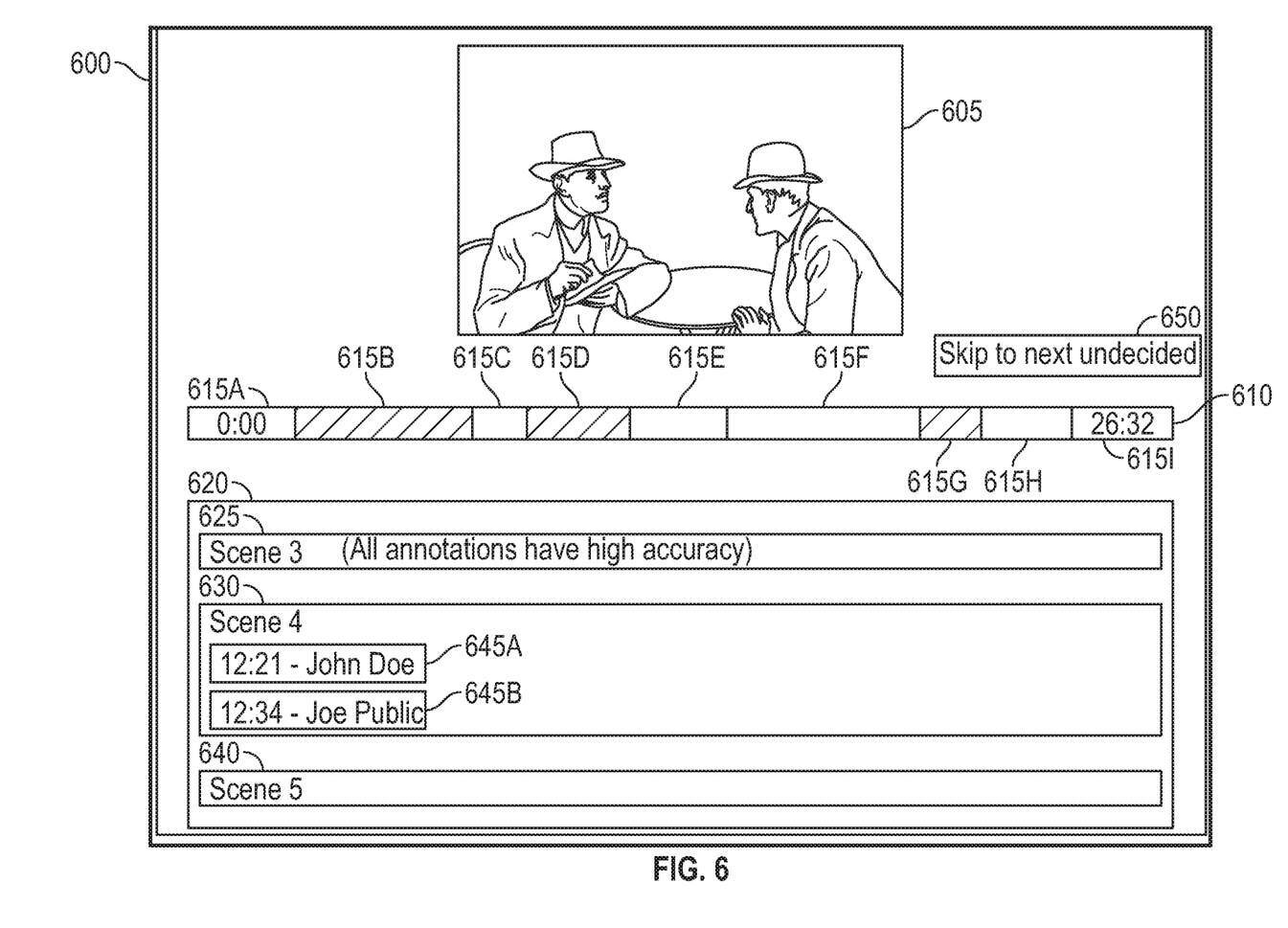
FIG. 6 depicts an optimized graphical user interface used to complete a review process for automatically generated tags, according to one embodiment disclosed herein.

FIG. 6 depicts an optimized graphical user interface (GUI) 600 used to complete a review process for automatically generated tags, according to one embodiment disclosed herein. In one embodiment, the GUI 600 is used to output tagged segments for review, verification, and/or validation. The illustrated GUI 600 includes an Output 605 where the underlying content (e.g., video data) is displayed. In the depicted embodiment, the portion of the content currently being displayed/reviewed includes two characters interacting. Additionally, the GUI 600 includes a Timeline 610 that allows users to visually identify where they currently are in the content, as well as select other portions of the content to view.

As illustrated, the Timeline 610 depicts a plurality of Segments 615A-I, indicating the sections, scenes, sub-scenes, or other defined portions of the input content. Further, the coloring, shading, or other visual depiction of each Segment 615A-I reflects the status of the segment. For example, in one embodiment, Segments 615A-I that are accurate or satisfactory (defined by the tags included therein) may be shaded one color (e.g., white or green), while Segments 615A-I that need review can be shaded another (e.g., black or red). In an embodiment, the user can skip between individual Segments 615A-I using the Timeline 610, and/or the section of the GUI 600 that provides segment Summaries 620.

As illustrated, the Summaries 620 provide expandable and collapsible sections for each segment (labeled 625, 630, and 640). Specifically, in the illustrated embodiment, each Segment 615A-I is a scene in the video content. As illustrated, Scene 3, included in box 625 of the Summaries 620, may correspond to Segment 615C in Timeline 610, and is marked as acceptable ("All annotations have high accuracy"), indicating that it need not be reviewed. In some embodiments, when this Segment 615C is reached during review, it can be automatically or manually skipped. Additionally, in the illustrated embodiment, Scene 4 has been expanded (block 630 of the Summaries 620) to display the tags or annotations included in the scene. Scene 4 may correspond to Segment 615D in Timeline 610. As illustrated, the corresponding Segment 615D is annotated to indicate that a "John Doe" character is present beginning at timestamp 12:21 (indicated by Tag 645A), and a "Joe Public" character is present at timestamp 12:34 (indicated by Tag 645B).

Although not depicted in the illustrated embodiment, in some embodiments, one or more buttons are also provided in association with each Tag 645A-B, allowing the user to approve, reject, and modify each Tag 645A-B, based on what they see in the Output 605. Furthermore, in the illustrated embodiment, the GUI 600 includes a Button 650 labeled "Skip to next undecided," which bypasses accurate Segments 615 and proceeds to the next Segment 615 needing review. Referring to the example of FIG. 6, the content includes Segments 615D, 615E, 615F, and 615G, sequentially. Suppose that Segments 615E and 615F are accurate and complete, while Segments 615D and 615G need review. In an embodiment, when the user finishes reviewing segment 615D, the GUI 600 can prompt the user (e.g., via a pop up, via the Button 650, via a noise, and the like) to bypass to the next segment needing review. This will skip Segments 615E and 615F, and proceed straight to Segment 615G. Additionally, in on embodiment, the system automatically bypasses Segments 615E and 615F, rather than waiting for user input. In this way, the system can optimize the review procedure, reducing the time it takes for a user to manually tag content.

Figure 7:
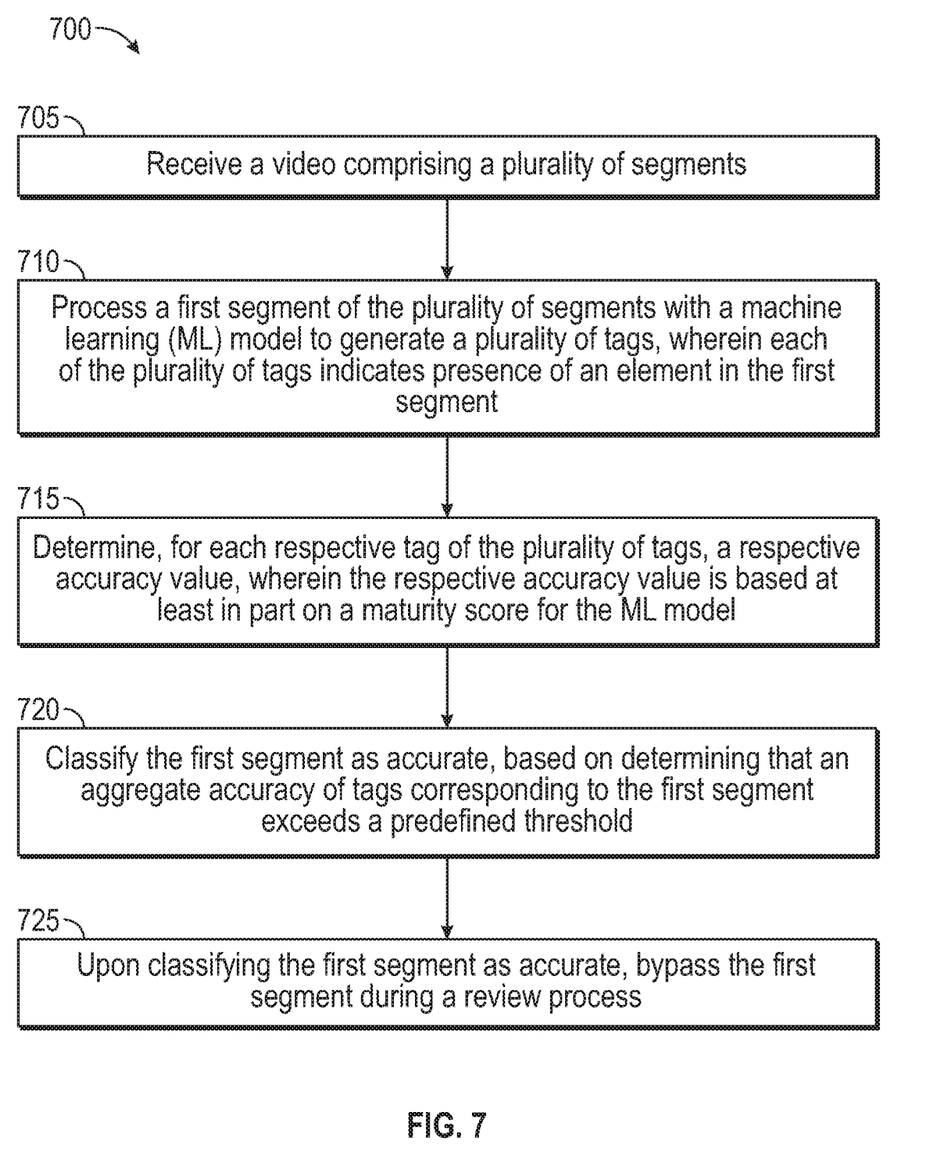
FIG. 7 is a flow diagram illustrating a method for efficiently tagging and classifying media content using machine learning, according to one embodiment disclosed herein.

FIG. 7 is a flow diagram illustrating a method 700 for efficiently tagging and classifying media content using machine learning, according to one embodiment disclosed herein. The method 700 begins at block 705, where a Tagging System 110 receives a video comprising a plurality of segments. At block 710 the Tagging System 110 processes a first segment of the plurality of segments with a machine learning (ML) model to generate a plurality of tags, wherein each of the plurality of tags indicates presence of an element in the first segment. The method 700 then proceeds to block 715, where the Tagging System 110 determines, for each respective tag of the plurality of tags, a respective accuracy value, wherein the respective accuracy value is based at least in part on a maturity score for the ML model. Further, at block 720, the Tagging System 110 classifies the first segment of the plurality of segments as accurate, based on determining that an aggregate accuracy of tags corresponding to the first segment exceeds a predefined threshold. The method 700 continues to block 725, where, upon classifying the first segment as accurate, the Tagging System 110 bypasses the first segment during a review process.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    receiving a video comprising a plurality of segments;
    processing a first segment of the plurality of segments with a machine learning (ML) model to generate a plurality of tags, wherein each of the plurality of tags indicates presence of an element in the first segment;
    determining, for each respective tag of the plurality of tags, a respective accuracy value, wherein the respective accuracy value is based at least in part on a maturity score generated for the ML model based on aggregating a plurality of model-specific scores for a plurality of versions of the ML model, wherein a respective weight assigned to each respective version of the plurality of versions is inversely proportional to a respective age of the respective version;
    classifying the first segment as accurate, based on determining that an aggregate accuracy of tags corresponding to the first segment exceeds a predefined threshold; and
    upon classifying the first segment as accurate, bypassing the first segment during a review process.

2. The method of claim 1, wherein the review process comprises:

outputting a second segment from the plurality of segments via a graphical user interface (GUI);
outputting an indication of corresponding tags associated with the second segment;
upon receiving feedback on the corresponding tags, identifying a third segment from the plurality of segments via the GUI; and
upon determining that the third segment is classified as accurate:
bypassing the third segment; and
outputting a fourth segment from the plurality of segments.

3. The method of claim 2, wherein bypassing the third segment is further based on:
outputting, via the GUI, an indication that the third segment is accurate; and
receiving input specifying to skip the third segment.

4. The method of claim 1, wherein the plurality of tags include a plurality of unknown tags, wherein each unknown tag corresponds to an element that could not be identified by the ML model, the method further comprising:
grouping unknown tags of the plurality of unknown tags into one or more clusters based on similarity between the unknown tags.

5. The method of claim 4, the method further comprising:
upon receiving an identification for a first unknown tag assigned to a first cluster of the one or more clusters, assigning the identification to each other unknown tag in the first cluster.

6. A method, comprising:
receiving a video comprising a plurality of segments;
processing a first segment of the plurality of segments with a machine learning (ML) model to generate a plurality of tags, wherein each of the plurality of tags indicates presence of an element in the first segment;
determining, for each respective tag of the plurality of tags, a respective accuracy value, wherein the respective accuracy value is based at least in part on a maturity score generated for the ML model based on how many times the ML model has correctly identified the element of the respective tag as being present in video segments previously processed with the ML model, compared to how many times the element has actually been present in the video segments previously processed with the ML model;
classifying the first segment as accurate, based on determining that an aggregate accuracy of tags corresponding to the first segment exceeds a predefined threshold; and
upon classifying the first segment as accurate, bypassing the first segment during a review process.

7. The method of claim 6, wherein the maturity score comprises a plurality of element-specific scores, such that a first element is associated with a first element-specific score and a second element is associated with a second element-specific score.

8. A non-transitory computer-readable medium containing computer program code that, when executed by operation of one or more computer processors, performs an operation comprising:
receiving a video comprising a plurality of segments;
processing a first segment of the plurality of segments with a machine learning (ML) model to generate a plurality of tags, wherein each of the plurality of tags indicates presence of an element in the first segment;
determining, for each respective tag of the plurality of tags, a respective accuracy value, wherein the respective accuracy value is based at least in part on a maturity score generated for the ML model based on aggregating a plurality of model-specific scores for a plurality of versions of the ML model, wherein a respective weight assigned to each respective version of the plurality of versions is inversely proportional to a respective age of the respective version;
classifying the first segment as accurate, based on determining that an aggregate accuracy of tags corresponding to the first segment exceeds a predefined threshold; and
upon classifying the first segment as accurate, bypassing the first segment during a review process.

9. The computer-readable medium of claim 8, wherein the review process comprises:
outputting a second segment from the plurality of segments via a graphical user interface (GUI);
outputting an indication of corresponding tags associated with the second segment;
upon receiving feedback on the corresponding tags, identifying a third segment from the plurality of segments via the GUI; and
upon determining that the third segment is classified as accurate:
bypassing the third segment; and
outputting a fourth segment from the plurality of segments.

10. The computer-readable medium of claim 9, wherein bypassing the third segment is further based on:
outputting, via the GUI, an indication that the third segment is accurate; and
receiving input specifying to skip the third segment.

11. The computer-readable medium of claim 8, wherein the plurality of tags include a plurality of unknown tags, wherein each unknown tag corresponds to an element that could not be identified by the ML model, the operation further comprising:
grouping unknown tags of the plurality of unknown tags into one or more clusters based on similarity between the unknown tags.

12. The computer-readable medium of claim 11, the operation further comprising:
upon receiving an identification for a first unknown tag assigned to a first cluster of the one or more clusters, assigning the identification to each other unknown tag in the first cluster.

13. A system, comprising:
one or more computer processors; and
a memory containing a program which when executed by the one or more computer processors performs an operation, the operation comprising:
receiving a video comprising a plurality of segments;
processing a first segment of the plurality of segments with a machine learning (ML) model to generate a plurality of tags, wherein each of the plurality of tags indicates presence of an element in the first segment;
determining, for each respective tag of the plurality of tags, a respective accuracy value, wherein the respective accuracy value is based at least in part on a maturity score generated for the ML model based on aggregating a plurality of model-specific scores for a plurality of versions of the ML model, wherein a respective weight assigned to each respective version of the plurality of versions is inversely proportional to a respective age of the respective version;

classifying the first segment as accurate, based on determining that an aggregate accuracy of tags corresponding to the first segment exceeds a predefined threshold; and upon classifying the first segment as accurate, bypassing the first segment during a review process.

14. The system of claim 13, wherein the review process comprises:

outputting a second segment from the plurality of segments via a graphical user interface (GUI);

outputting an indication of corresponding tags associated with the second segment;

upon receiving feedback on the corresponding tags, identifying a third segment from the plurality of segments via the GUI; and upon determining that the third segment is classified as accurate:
bypassing the third segment; and
outputting a fourth segment from the plurality of segments.

15. The system of claim 14, wherein bypassing the third segment is further based on:

outputting, via the GUI, an indication that the third segment is accurate; and receiving input specifying to skip the third segment.

16. The system of claim 13, wherein the plurality of tags include a plurality of unknown tags, wherein each unknown tag corresponds to an element that could not be identified by the ML model, the operation further comprising:

grouping unknown tags of the plurality of unknown tags into one or more clusters based on similarity between the unknown tags.

17. The system of claim 16, the operation further comprising:

upon receiving an identification for a first unknown tag assigned to a first cluster of the one or more clusters, assigning the identification to each other unknown tag in the first cluster.

18. A non-transitory computer-readable medium containing computer program code that, when executed by operation of one or more computer processors, performs an operation comprising:

receiving a video comprising a plurality of segments;

processing a first segment of the plurality of segments with a machine learning (ML) model to generate a plurality of tags, wherein each of the plurality of tags indicates presence of an element in the first segment;

determining, for each respective tag of the plurality of tags, a respective accuracy value, wherein the respective accuracy value is based at least in part on a maturity score generated for the ML model based on how many times the ML model has correctly identified the element of the respective tag as being present in video segments previously processed with the ML model, compared to how many times the element has actually been present in the video segments previously processed with the ML model;

classifying the first segment as accurate, based on determining that an aggregate accuracy of tags corresponding to the first segment exceeds a predefined threshold; and upon classifying the first segment as accurate, bypassing the first segment during a review process.

19. The non-transitory computer-readable medium containing computer program code of claim 18, wherein the maturity score comprises a plurality of element-specific scores, such that a first element is associated with a first element-specific score and a second element is associated with a second element-specific score.

20. A system, comprising:

one or more computer processors; and a memory containing a program which when executed by the one or more computer processors performs an operation, the operation comprising:

receiving a video comprising a plurality of segments;

processing a first segment of the plurality of segments with a machine learning (ML) model to generate a plurality of tags, wherein each of the plurality of tags indicates presence of an element in the first segment;

determining, for each respective tag of the plurality of tags, a respective accuracy value, wherein the respective accuracy value is based at least in part on a maturity score generated for the ML model based on how many times the ML model has correctly identified the element of the respective tag as being present in video segments previously processed with the ML model, compared to how many times the element has actually been present in the video segments previously processed with the ML model;

classifying the first segment as accurate, based on determining that an aggregate accuracy of tags corresponding to the first segment exceeds a predefined threshold; and upon classifying the first segment as accurate, bypassing the first segment during a review process.

21. The system of claim 20, wherein the maturity score comprises a plurality of element-specific scores, such that a first element is associated with a first element-specific score and a second element is associated with a second element-specific score.

* * * * *